US008624890B2

(12) United States Patent
De Bliek et al.

(10) Patent No.: US 8,624,890 B2
(45) Date of Patent: Jan. 7, 2014

(54) METHOD, APPARATUS AND COMPUTER-READABLE MEDIUM FOR CREATING A PRESET MAP FOR THE VISUALIZATION OF AN IMAGE DATASET

(75) Inventors: Hubrecht Lambertus Tjalling De Bliek, Eindhoven (NL); Cornelis Pieter Visser, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 952 days.

(21) Appl. No.: 12/375,031

(22) PCT Filed: Jul. 26, 2007

(86) PCT No.: PCT/IB2007/052970
§ 371 (c)(1),
(2), (4) Date: Jan. 26, 2009

(87) PCT Pub. No.: WO2008/015620
PCT Pub. Date: Feb. 7, 2008

(65) Prior Publication Data
US 2009/0256838 A1 Oct. 15, 2009

(30) Foreign Application Priority Data
Jul. 31, 2006 (EP) .................................. 06118162

(51) Int. Cl.
*G06T 15/00* (2011.01)
(52) U.S. Cl.
USPC .......................................... 345/419; 345/440
(58) Field of Classification Search
USPC ........................................................ 345/424
See application file for complete search history.

(56) References Cited

U.S. PATENT DOCUMENTS

| 5,305,204 | A | * | 4/1994 | Ohhashi ........................ 382/131 |
| 5,542,003 | A | | 7/1996 | Wofford |
| 6,236,751 | B1 | * | 5/2001 | Farrell ........................ 382/168 |
| 6,690,371 | B1 | * | 2/2004 | Okerlund et al. ............ 345/424 |
| 7,277,567 | B2 | | 10/2007 | Miyamoto et al. |
| 2003/0144589 | A1 | * | 7/2003 | Roell ........................ 600/410 |
| 2003/0169254 | A1 | * | 9/2003 | Ditt et al. ........................ 345/419 |
| 2004/0017370 | A1 | | 1/2004 | Miyamoto et al. |

FOREIGN PATENT DOCUMENTS

| EP | 0283255 A2 | 9/1988 |
| EP | 0409206 A2 | 1/1991 |
| JP | 63298279 A | 12/1988 |

(Continued)

OTHER PUBLICATIONS

Laszlo G. Nyul et al, On Standardizing the MR Image Intensity Scale, 1999, Magnetic Resonance in Medicine.*

(Continued)

*Primary Examiner* — Ke Xiao
*Assistant Examiner* — Kyle Zhai

(57) ABSTRACT

A method for creating a preset map for the visualization of an image dataset is provided. The method comprises dynamically adapting the preset map based on image dataset properties resulting in an adapted preset map. The method may be used for identifying the gray value similarity between the volume that the preset was created for and the volume to which the preset is supplied. This similarity measure is used to adapt the preset. As a result comparable 3D images, including structure and color, are created. An apparatus and a computer-readable medium are also provided.

22 Claims, 6 Drawing Sheets

(56) References Cited

FOREIGN PATENT DOCUMENTS

| | | | |
|---|---|---|---|
| JP | 2004057411 | A | 2/2004 |
| WO | 2005073921 | A2 | 8/2005 |
| WO | 2006048802 | A2 | 5/2006 |

OTHER PUBLICATIONS

Nyul L G et al: "On standardizing the MR image intensity scale" Magnetic Resonance in Medicine, Wiley USA, vol. 42, No. 6, Dec. 1999, pp. 1072-1081, XP002505239 ISSN: 0740-3194.

Joe Kniss, et al; Multidimensional Transfer Functions for Interactive Volume Rendering, IEEE Transactions on Visualization and Computer Graphics, vol. 8, No. 3, Jul.-Sep. 2002, pp. 270-285.

Guy M Nicoletti; Optimal Generation of Transfer Functions for Direct Volume Rendering, 2003 IEEE, Proc. 35th Souteastern Symposium on System Theory, Mar. 2003, pp. 367-371.

Guy M Nicoletti; Volume Visualization: Advances in Transfer and Opacity Function Generation for Interactive Direct Volume Rendering, 2004 IEEE, Proc. Thirty-Sixth Southeastern Symposium on System Theory, 2004, pp. 1-5.

Jani AB, et al; Accuracy of Object Depiction and Opacity Transfer Function optimization in CT Volume-rendering images, J. Comput Assist Tomogr, May-Jun. 1998; 22(3):459-470.

* cited by examiner

METHOD, APPARATUS AND COMPUTER-READABLE MEDIUM FOR CREATING A PRESET MAP FOR THE VISUALIZATION OF AN IMAGE DATASET

FIELD OF THE INVENTION

This invention pertains in general to the field of image analysis. More particularly the invention relates 3-D volume visualization for displaying structures present in a scanned volume, e.g. from Computed Tomography (CT), Magnetic Resonance Imaging (MRI) and Ultrasound Imaging (US).

BACKGROUND OF THE INVENTION 3D volume visualization is an accepted technique to display structures present in a scanned volume, e.g. from CT, MRI or US. This visualization technique needs a color and an opacity map as input. The opacity map defines the structure to be visualized and the color map defines the coloring of the structure. Manual definition of the color and opacity map is not straightforward. To work around this problem presets are defined for the color and opacity maps. However, a preset is defined for a volume with specific voxel values. The result of a preset becomes invalid when applied to a volume containing a structure with different voxel values.

In viewing applications 3D visualization techniques are used to view the content of the volume data. To create an appealing 3D visualization a color map and an opacity map are defined. However, it is not straightforward to create these maps. Often a user can choose from preset color and opacity maps instead of having to perform this laborious task.

The Philips ViewForum workstation offers the possibility to create 3D visualizations from a volume scan (CT or MR). The user may create 3D visualizations with help of the so-called surface shaded direct volume rendering algorithm. With this rendering technique it is possible to create realistic images from the volume scan. Dependent upon the values present in the color and opacity maps different structures, present in the volume scan, may be visualized.

On the Philips ViewForum workstation the user may choose from a wide range of defined presets for the color and opacity maps. These presets are created and tested on a limited number of volume scans and tuned to visualize certain structures.

Currently the presets are static. This means that the contents of the color and opacity map are passed directly to the rendering algorithm. This means that when a preset is developed on a certain volume scan to visualize a certain structure, it is not guaranteed that this presets results in comparable 3D visualizations when supplied to other volume scans.

Hence, an improved method, apparatus, and computer-readable medium would be advantageous, allowing for increased flexibility, cost-effectiveness, and visualization resolution.

SUMMARY OF THE INVENTION

Accordingly, the present invention preferably seeks to mitigate, alleviate or eliminate one or more of the above-identified deficiencies in the art and disadvantages singly or in any combination and solves at least the above-mentioned problems by providing a method, apparatus and a computer-readable medium, according to the appended patent claims.

According to one aspect of the invention, a method for creating a preset map for the visualization of an image dataset is provided. The method comprises dynamically adapting the preset map based on image dataset properties resulting in an adapted preset map.

According to another aspect of the invention, an apparatus for creating a preset map for the visualization of an image dataset is provided. The apparatus comprises a unit for dynamically adapting the preset map based on image dataset properties resulting in an adapted preset map.

According to yet another aspect of the invention, a computer-readable medium is provided. The computer-readable medium has embodied thereon a computer program for processing by a computer for creating a preset map for the visualization of an image dataset. The computer program comprises a code segment for dynamically adapting the preset map based on image dataset properties resulting in an adapted preset map.

When using the method according to some embodiments 3D visualizations of the same structure, created from different volume scans will result in comparable images, in regards of color and transparency.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

The present invention provides a method that may be used for identifying the gray value similarity between the volume that the preset was created for and the volume to which the preset is supplied. This similarity measure is used to tune the preset. As a result comparable 3D images, including structure and color, are created.

The following description focuses on embodiments of the present invention applicable to applications that use visualization parameter presets for the display of volume rendered images (image datasets). Examples of the visualization parameter presets are the color map and the opacity map.

The basic idea of the invention is to tune or adapt the preset values in a preset map corresponding to a first volume scan (3D or multi-dimensional image dataset) to the current specific volume scan before passing the preset values to a rendering algorithm for 3D visualization.

In an embodiment method for creating a preset map for the visualization of an image dataset is provided. The preset map may e.g. be a color map or an opacity map. The method comprises dynamically adapting the preset map based on image dataset properties resulting in an adapted preset map.

Figure 1:
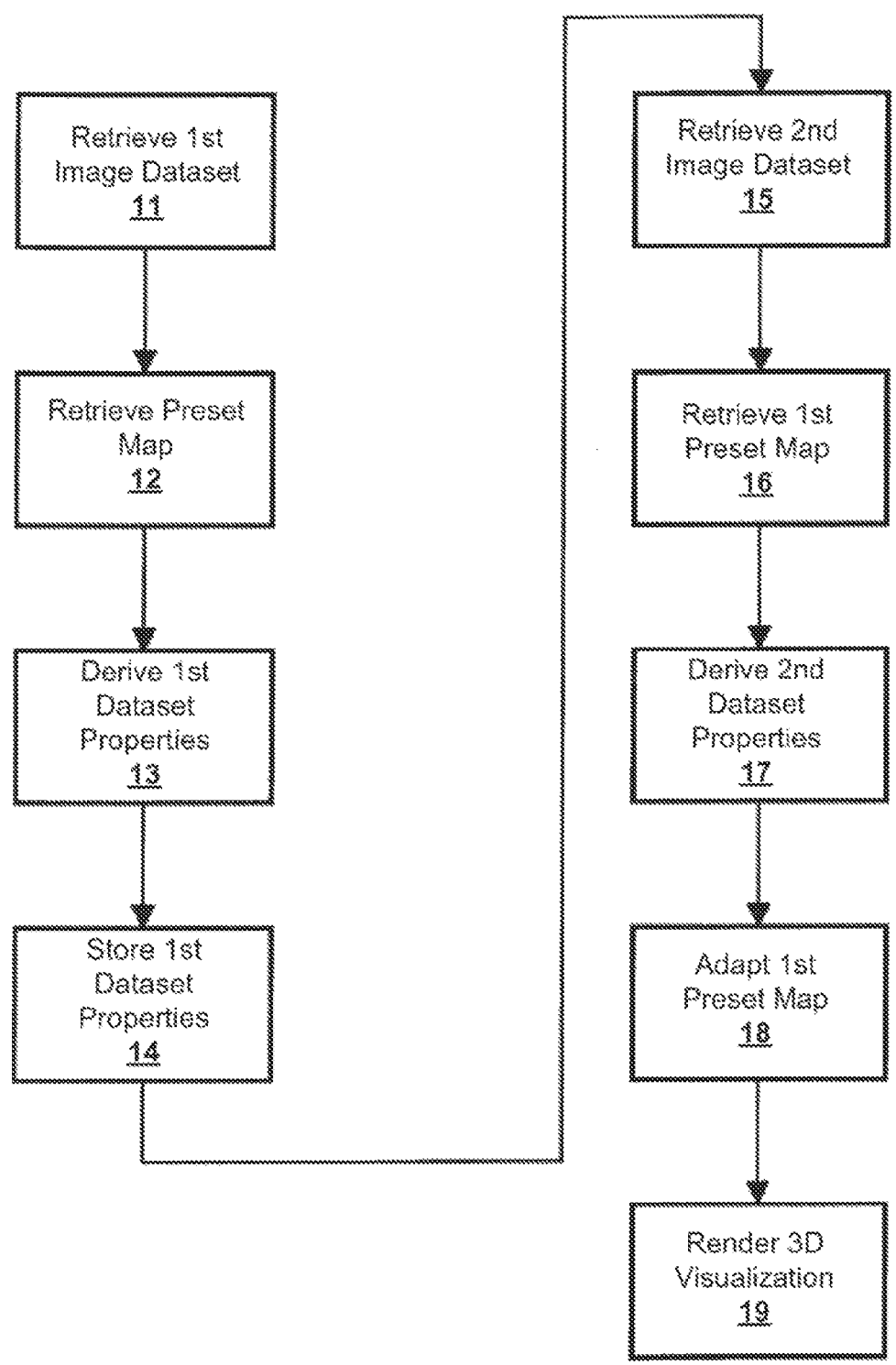
FIG. 1 is a flow chart showing a method according to an embodiment.

In an embodiment of the invention, according to FIG. 1, the dynamically adapting of the preset map comprises:

retrieving 11 a first image dataset, retrieving 12 a preset map corresponding to the first image dataset, deriving 13 first image dataset properties from the first image dataset, storing 14 the first image dataset properties together with the preset map in a first preset map, retrieving 15 a second image dataset, retrieving 16 the first preset map, deriving 17 image dataset properties in the second image dataset corresponding to the image dataset properties of the first image dataset, and adapting 18 the first preset map, based on the first image dataset properties and second image dataset properties, creating an adapted preset map.

This embodiment may be used for each new (second, third, etc.) image dataset that is to be analyzed describing a similar structure to that of the first image dataset. The great advantage of this embodiment is that the preset map for the new image dataset will be adapted based on image dataset properties from the preset map but adapted for the image dataset properties in the new image dataset and thus the result of the eventual 3D visualization will be greatly improved.

In an embodiment the method further comprises rendering 19 a 3D visualization based on the adapted preset map to be showed on a display.

In an embodiment the image dataset properties may be the position of local maxima/minima present in the histogram of the image dataset. Using the method according to an embodiment it is thus possible to compare image datasets and utilize the difference between similar positions of the first image dataset and the new image dataset to modify the preset map.

In an embodiment the image dataset properties may be the positions of slope angles present in the histogram of the image dataset. A slope angle is the angle the graph makes with respect to the histogram's horizontal axis (e.g. the position of the maximum slope angle). The minimum/maximum graph value positions and e.g. the positions of the minimum/maximum slope angles may be used to describe the histogram.

In an embodiment the image dataset properties may be and a combination of position of local maxima/minima and position of slope angles.

In an embodiment the image dataset properties may be the first derivative of an interpolated histogram of the image dataset.

The image dataset properties may be derived from the entire image dataset or from a defined volume of interest comprised in the image dataset or from a structure in the image dataset.

In an embodiment the preset maps are defined for a color or opacity map.

In an embodiment of the invention the image dataset is 3D or higher-dimensional image dataset describing one or more volume scans, e.g. created by Computed Tomography, Magnetic Resonance Imaging or Ultrasound Imaging.

There are several ways of determining whether the new image dataset comprises similar structures to that of the first image dataset. The method according to some embodiments functions satisfactory when there is a correlation between the first image dataset for which first image dataset parameters are derived and the new image dataset for which corresponding image parameters are derived. Different Computer Vision and Image Analysis techniques may be used to correlate structures located in the first image dataset to structures in the new image dataset. A commonly known technique to identify a structure in an image dataset is segmentation that may be performed on the first and new image datasets. Comparing the similarity between histograms of segmented structures is much easier then comparing histograms of entire volumes. If the segmentation is performed manually the person segmenting the structure must ensure that the structure is segmented correctly. In many cases the segmentation may be performed automatically, e.g. by a computer program.

Figure 2:
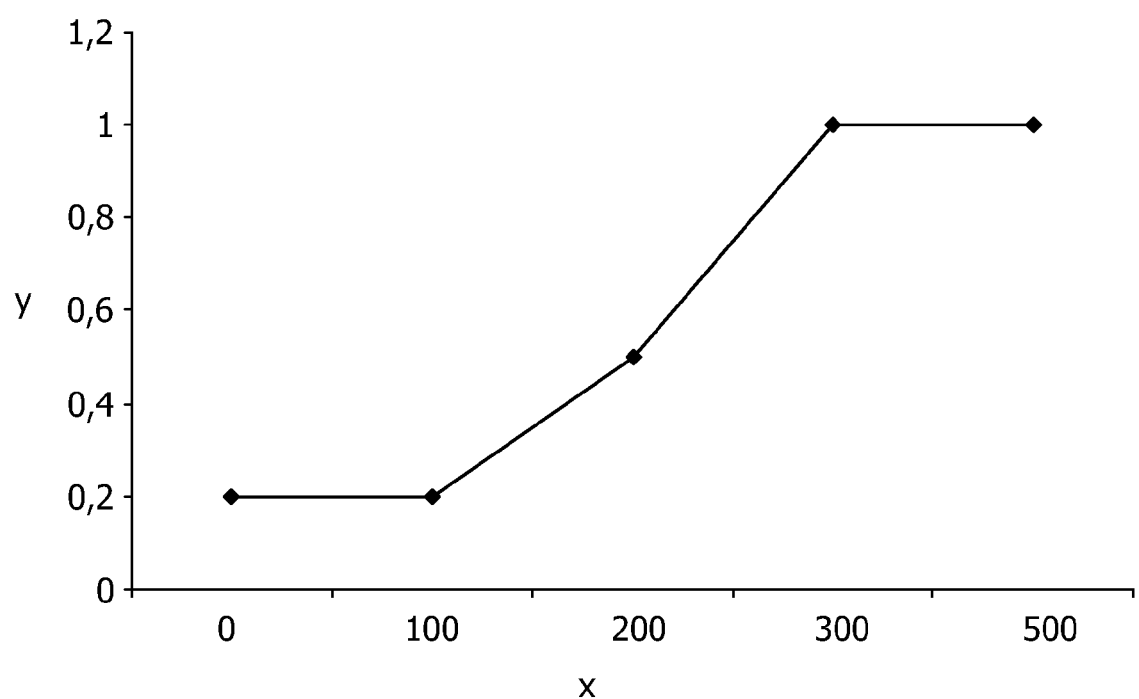
FIG. 2 is a chart showing a preset map according to an embodiment.

The parameters of the preset map may be different for the type of visual presentation. In an embodiment, according to FIG. 2, the parameters of the preset map, first preset map, and adapted preset map are Level and Width. These parameters describe the global properties of the preset map. FIG. 2 illustrates an opacity map containing the following values (0.0, 0.2), (100.0, 0.2), (200.0, 0.5), (300.0, 1.0), (500.0, 1.0). Width is defined as the difference between the last and the first changing map values with reference to the y-axis. Thus the Width of this opacity map equals 300.0−100.0=200.0. The Level is defined as the center position between the first and the last changing preset map values. Accordingly the Level is positioned at 200.0 for the given opacity map. The Level and Width values may also be used to position and scale the entire preset map, meaning that if the adapted Level value calculated from the new image dataset (histogram) turns out to be 100.0 then the entire map will shift 100 to the left. If the Width value changes then the map values will be stretched or shrunk (scaled) in the direction of x-axis. It should be noted that this is a specific embodiment in which the found histogram properties are applied to the entire map. In other embodiments it is naturally also possible to apply the found image dataset (histogram) properties more local to the preset map, i.e. local scale at multiple found image dataset (histogram) positions, instead of global scale. This means that several Level and Width location based parameters may be used in the preset map for different locations found in the histogram of the image dataset.

The adapted preset map(s) may be created with the purpose to visualize a certain structure present in the image dataset. From the image dataset, properties of this structure are derived and stored together with the preset map using the method according to an embodiment. By using the method according to some embodiments 3D visualizations of the same structure, created from different image datasets will result in comparable images, in regards of color and transparency.

In an embodiment the first preset map is only calculated once and may be applied to several new image datasets. In this way steps 11-14 is performed once, and 15-18 and optionally step 19 are performed for each of the new image datasets.

Figure 3A:
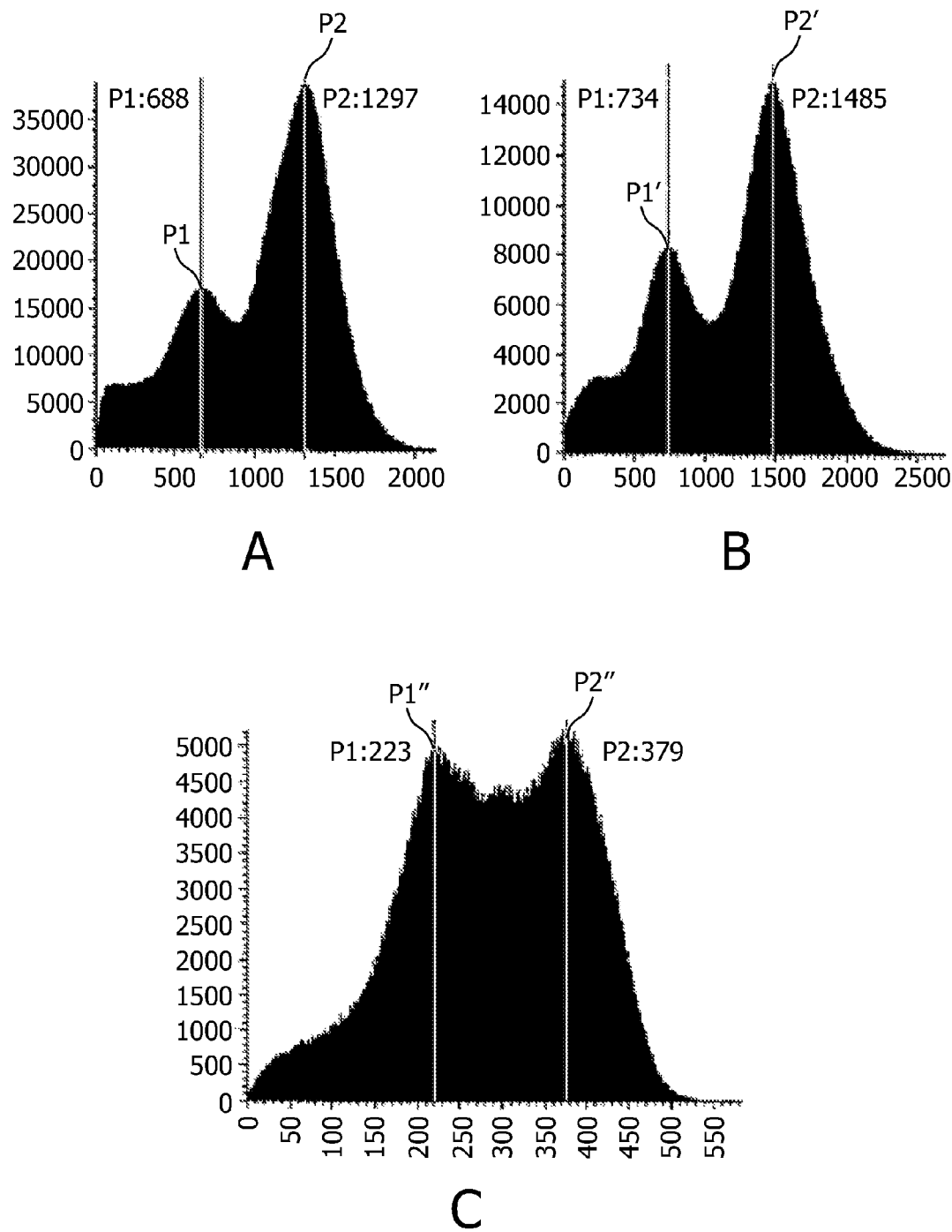
FIG. 3 is an illustration showing a practical implementation of the method according to an embodiment.

In an embodiment, according to FIG. 3, the method according to an embodiment is practically implemented for the visualization of a heart present in an MRI image dataset. The heart consists of two distinguishable structures, namely soft tissue and blood pool. Thus in this embodiment the properties derived from the image datasets are the gray value locations of these structures in histograms of the image datasets. Prior to deriving these image dataset properties the image dataset of the heart may be segmented. In FIG. 3a three histograms A, B, C from three different image datasets, e.g. originating from different hospitals, illustrate the two distinguishable parts of the heart. In these histograms the two peaks P1, P1', P1" and P2, P2', P2", respectively represent the two distinguishable structures. Using the method according to some embodiments the first preset map is created based on the first histogram presented in FIG. 3a and the first image dataset properties, e.g. the two peak values P1 and P2. When this first preset map is applied to the other two image datasets then the first preset map may be adapted in the following manner. Firstly, the first preset map comprising the preset map and the image dataset properties, peak values P1 and P2, is retrieved (step 12 in FIG. 1). Then (step 13 in FIG. 1) the intensity level 311 and width 312 for the preset map are determined, as well as new peak values P1' and P2' for the new image dataset, and moreover new intensity level values (Level') 321, 331 and width values (Width') 322, 332 are calculated, e.g. by using the following equations which does not require great computation capacity:

$$\text{Level}' = P1' + \frac{(\text{Level} - P1)}{(P2 - P1)} * (P2' - P1'),$$

and $$\text{Width}' = \frac{\text{Width}}{(P2 - P1)} * (P2' - P1')$$

Figure 3B:
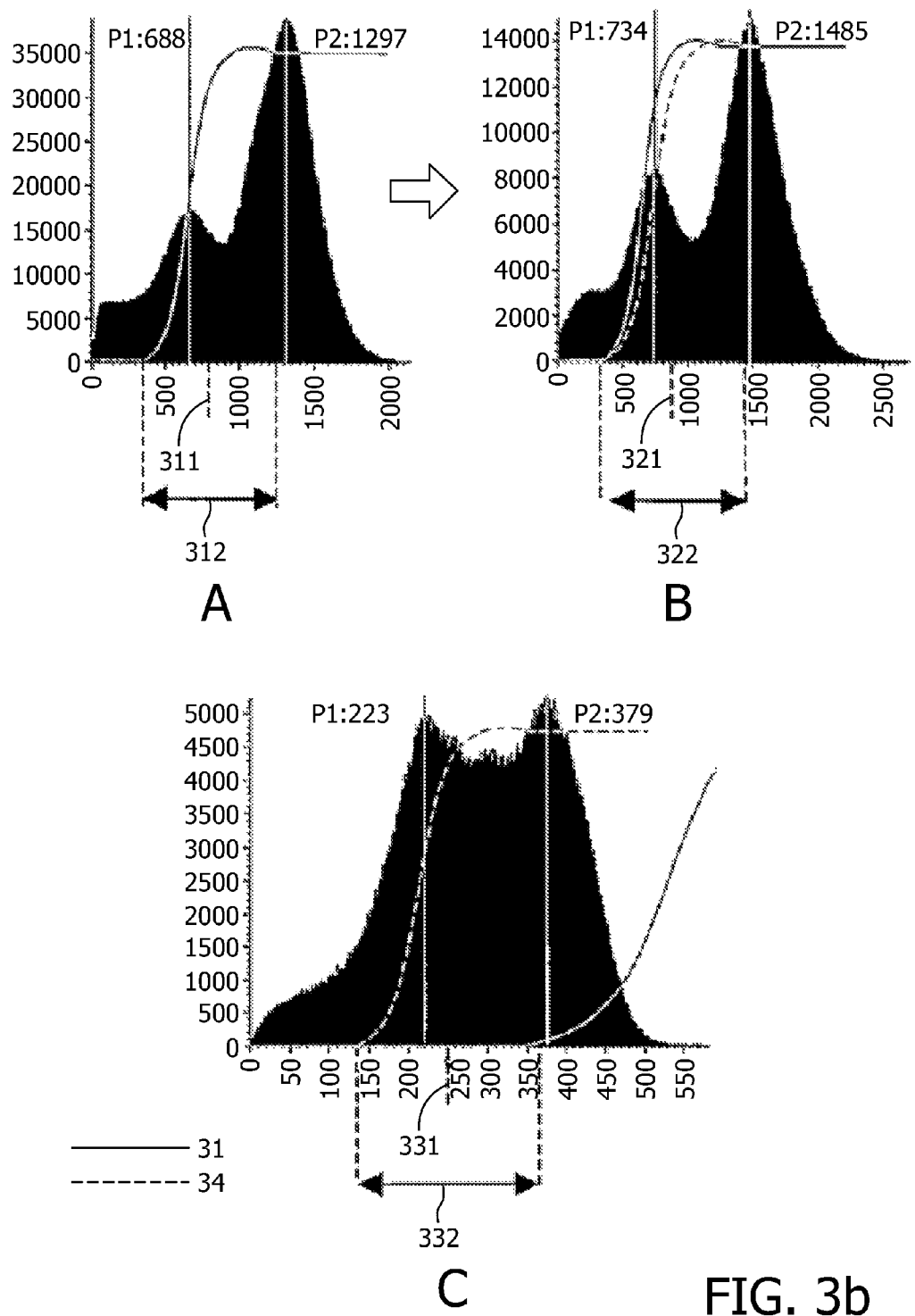

The last step, namely the adapting step 23, illustrated by FIG. 3b, involves creating the adapted preset 34 map by aligning (see FIG. 2) the first preset map to the new image dataset by means of the new Level' values 321, 331 and Width' values 322, 332. As the method in this embodiment utilizes the histograms of the image datasets the resulting adapted preset map may be referred to as a histogram driven preset. It should be noted that the preset map 31, i.e. original preset map without image properties included, applied to histogram C in FIG. 3b, which would be the approach according to prior art, might result in an almost empty 3D image. This illustrates the great advantage of some embodiments of the invention over prior art.

The present invention provides a method that identifies image dataset properties for a first image dataset to create a first preset map comprising the preset map and the first image dataset properties. Furthermore the present invention provides a way to adapt the first preset map to a new image dataset to improve 3D visualization.

In an embodiment an apparatus (40) for creating a preset map for the visualization of an image dataset is provided. The apparatus comprises a unit for dynamically adapting the preset map based on image dataset properties resulting in an adapted preset map.

Figure 4:
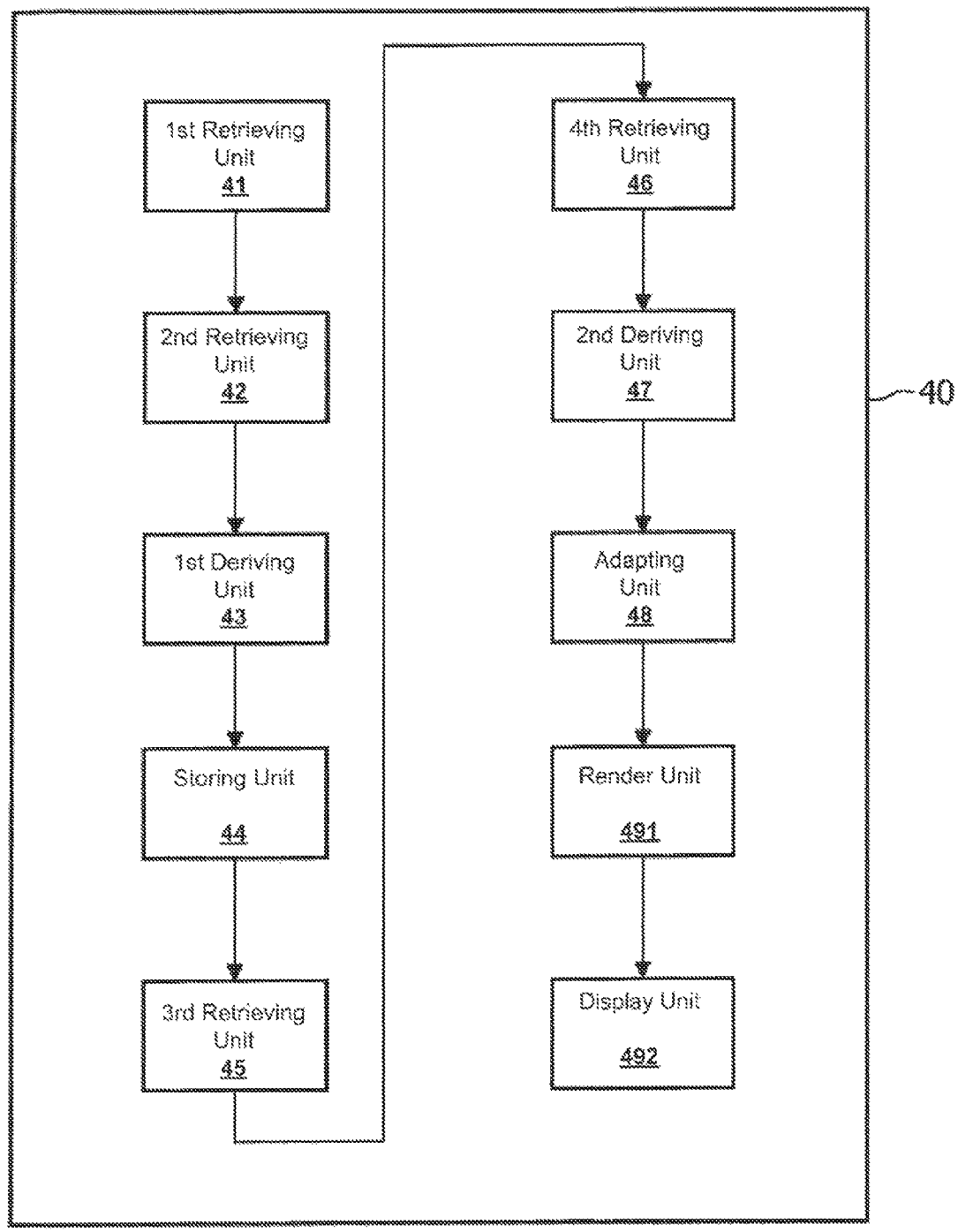
FIG. 4 is a schematic view of an apparatus according to an embodiment.

In an embodiment, according to FIG. 4, the unit for dynamically adapting of the apparatus (40) further comprises a first retrieving unit 41 for retrieving a first image dataset and a second retrieving unit 42 for retrieving the preset map. Moreover the apparatus comprises a first deriving unit 43 for deriving first image dataset properties from the first image dataset, and a storing unit 44 for storing the first image dataset properties together with the preset map in a first preset map. The apparatus further comprises a third retrieving unit 45 for retrieving a new image dataset, and a fourth retrieving unit 46 for retrieving the first preset map. Moreover the apparatus comprises a second deriving unit 47 for deriving second image dataset properties from the first image dataset, and an adapting unit 48 for adapting the first preset map, based on first image dataset properties and second image dataset properties, creating an adapted preset map.

In an embodiment the first, second, third and fourth retrieving unit is integrated into only one retrieving unit.

In an embodiment the first and second deriving unit is integrated into only one deriving unit.

In an embodiment of the invention the apparatus 40 further comprises a render unit 491 for rendering a 3D visualization of the second image dataset based on the adapted preset map.

In an embodiment the apparatus further comprises a display unit 492 for displaying the rendered 3D visualization to a user.

The retrieving unit(s), deriving unit(s), storing unit, optimization unit, and render unit may be any unit normally used for such tasks, e.g. a hardware, such as a processor with a memory. The processor could be any of variety of processors, such as Intel or AMD processors, CPUs, microprocessors, Programmable Intelligent Computer (PIC) microcontrollers, Digital Signal Processors (DSP), etc. However, the scope of the invention is not limited to these specific processors. The memory may be any memory capable of storing information, such as Random Access Memories (RAM) such as, Double Density RAM (DDR, DDR2), Single Density RAM (SDRAM), Static RAM (SRAM), Dynamic RAM (DRAM), Video RAM (VRAM), etc. The memory may also be a FLASH memory such as a USB, Compact Flash, SmartMedia, MMC memory, MemoryStick, SD Card, MiniSD, MicroSD, xD Card, TransFlash, and MicroDrive memory etc. However, the scope of the invention is not limited to these specific memories.

In an embodiment the apparatus 40 is comprised in a medical workstation or medical system, such as a Computed Tomography (CT) system, Magnetic Resonance Imaging (MRI) System or Ultrasound Imaging (US) system.

In an embodiment a computer-readable medium (50) having embodied thereon a computer program for processing by a computer for creating a preset map for the visualization of an image dataset is provided. The computer program comprises a code segment for dynamically adapting the preset map based on image dataset properties resulting in an adapted preset map.

Figure 5:
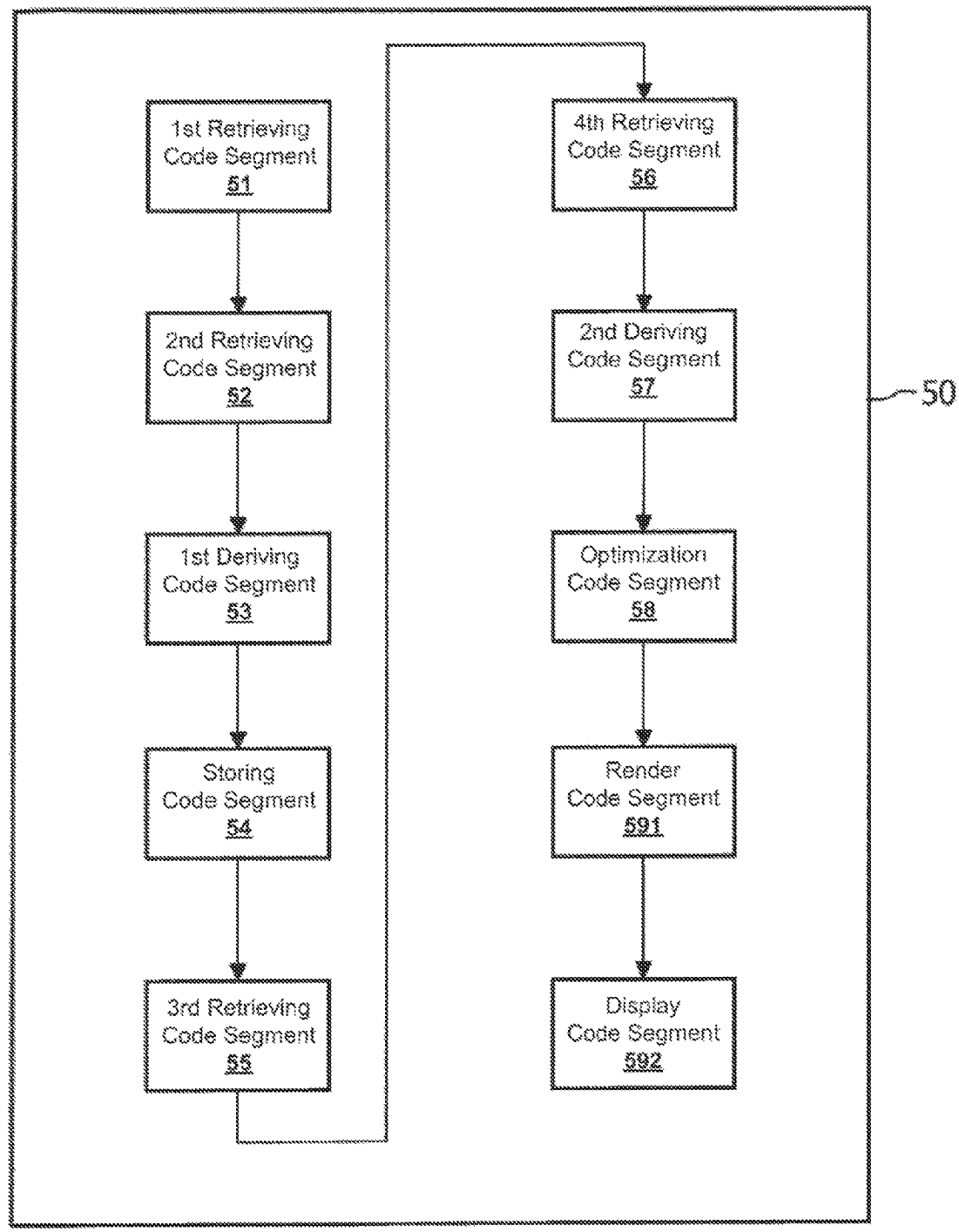
FIG. 5 is a schematic view of a computer-readable medium according to an embodiment.

In an embodiment, according to FIG. 5, the code segment further comprises code segments for performing the method according to some embodiments. The computer program comprises a first retrieving code segment 51 for retrieving the first image dataset. Furthermore the computer program comprises a second retrieving code segment 52 for retrieving the preset map. Moreover the computer program comprises a first deriving code segment 53 for deriving first image dataset properties from the first image dataset, and a storing code segment 54 for storing the first image dataset properties together with the preset map in a first preset map. The computer program has furthermore a third retrieving code segment 55 for retrieving a new image dataset and a fourth retrieving code segment 56 for retrieving the first preset map. Moreover the computer program comprises a second deriving code segment 57 for deriving second image dataset properties from the first image dataset, and an optimization code segment 58 for adapting the first preset map, based on first image dataset properties and second image dataset properties, creating an adapted preset map. In an embodiment the computer program further comprises a render code segment 591 for rendering a 3D visualization of the second image dataset based on the adapted preset map. This 3D visualization maybe created with help of a shaded volume render algorithm or any other algorithm that uses a preset map to help visualize structures of interest.

In an embodiment the computer program further comprises a display code segment 592 for displaying the rendered 3D visualization to a user. The user may select a preset from a preset list comprising several presets. This preset list may already display small versions of the presets when applied to the new image dataset.

In another embodiment the computer-readable medium comprises code segments arranged, when run by an apparatus having computer processing properties, for performing all of the method steps defined in any one of the embodiments.

Applications and use of the above-described embodiments according to the invention are various and include all exemplary fields that may benefit from using preset maps with image dataset properties to individualize 3D visualization for image datasets comprising the same structure of interest.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims. In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for creating a preset map for visualization of an image dataset, comprising:
   dynamically adapting, by a processor, said preset map based on image dataset properties resulting in an adapted preset map, the dynamically adapting comprising the steps of:
   (i) retrieving a first image dataset,
   (ii) retrieving said preset map corresponding to said first image dataset,
   (iii) deriving a first set of image dataset properties from said first image dataset, and
   (iv) storing said first set of image dataset properties together with said preset map in a first preset map
   retrieving, by the processor, said first preset map,
   retrieving, by the processor, a second image dataset,
   deriving, by the processor, a second set of image dataset properties, corresponding to said first set of image dataset properties in said first image dataset, from said second image dataset, and
   adapting, by the processor, said first preset map, based on said first set of image dataset properties and said second set of image dataset properties, resulting in said adapted preset map for said second image dataset.

2. The method according to claim 1, wherein said preset map is defined for a color map or opacity map.

3. The method according to claim 1, wherein said image dataset is a 2D, 3D or higher dimensional medical image dataset.

4. The method according to claim 1, wherein said first or second image dataset properties are position of local maxima/minima within said first or second image dataset.

5. The method according to claim 1, wherein said first or second image dataset properties are positions of slope angles within said first or second image dataset.

6. The method according to claim 1, wherein said first or second image dataset properties are a combination of position of local maxima/minima and positions of slope angles within said first or second image dataset.

7. The method according to claim 1, further comprising deriving said first set of image parameters and said second set of image parameters from the entire first image dataset and second image dataset, respectively, or from a defined volume of interest comprised in said first image dataset and said second image dataset, respectively.

8. A method according to claim 7, wherein said deriving first image dataset parameters comprises: determining at least two first peak values P1 and P2 in said first image dataset, determining an intensity level value (Level) and a width value (Width) for said preset map, and said deriving second image dataset parameters comprises: determining at least two second peak values P1' and P2' in said second image dataset, and calculating a second intensity level value (Level') and a second width value (Width').

9. The method according to claim 8, wherein said calculating comprises solving the equations:

$$\text{Level}' = P1' + \frac{(\text{Level} - P1)}{(P2 - P1)} * (P2' - P1'),$$

and $$\text{Width}' = \frac{\text{Width}}{(P2 - P1)} * (P2' - P1').$$

10. The method according to claim 8, wherein said adapting said first preset map comprises aligning said first preset map to said second image dataset by means of said second intensity level value (Level') and width value (Width').

11. The method according to claim 1, further comprising rendering said second image dataset based on said adapted preset map for 3D visualization.

12. The method according to claim 1, wherein the image dataset properties are gray value locations of a structure in a histogram of said second image dataset.

13. An apparatus for creating a preset map for visualization of an image dataset, comprising:
   a hardware unit for dynamically adapting said preset map based on image dataset properties resulting in an adapted preset map, the unit comprising:
   (i) a first retrieving unit for retrieving a first image dataset,
   (ii) a second retrieving unit for retrieving a preset map corresponding to said first image dataset,
   (iii) a first deriving unit for deriving a first set of image dataset properties from said first image dataset, and
   (iv) a storing unit for storing said first set of image dataset properties together with said preset map in a first preset map
   a third retrieving hardware unit for retrieving said first preset map,
   a fourth retrieving hardware unit for retrieving a second image dataset,
   a second deriving hardware unit for deriving a second set of image dataset properties, corresponding to said first set of image dataset properties in said first image dataset, from said second image dataset, and
   an adapting hardware unit for adapting said first preset map, based on said first set of image dataset properties and said second set of image dataset properties, resulting in an adapted preset map for said second image dataset.

14. The apparatus according to claim 13, wherein said first, second, third, and fourth retrieving hardware units are integrated into one retrieving unit.

15. The apparatus according to claim 13, wherein said first and second deriving units are integrated.

16. The apparatus according to claim 13, further comprising a render unit for rendering a 3D visualization of said second image dataset based on said adapted preset map.

17. The apparatus according to claim 13, further comprising a display unit for displaying said rendered 3D visualization to a user.

18. The apparatus according to claim 13, wherein said apparatus is comprised in a medical workstation.

19. A non-transitory computer-readable medium having embodied thereon a computer program for processing by a computer for creating a preset map for visualization of an image dataset, said computer program comprising a code segment for:
   dynamically adapting said preset map based on image dataset properties resulting in an adapted preset map;
   a first retrieving code segment for retrieving a first image dataset;
   a second retrieving code segment for retrieving a preset map corresponding to said first image dataset;
   a first deriving code segment for deriving a first set of image dataset properties from said first image dataset;
   a storing code segment for storing said first set of image dataset properties together with said preset map in a first preset map;
   a third retrieving code segment for retrieving said first preset map;
   a fourth retrieving code segment for retrieving a second image dataset;
   a second deriving code segment for deriving a second set of image dataset properties, corresponding to said first set of image dataset properties in said first image dataset, from said second image dataset; and
   an adapting code segment for adapting said first preset map, based on said first set of image dataset properties and said second set of image dataset properties, resulting in creating an adapted preset map for said second image dataset.

20. The non-transitory computer-readable medium according to claim 19, wherein the computer program further comprises a render code segment for rendering a 3D visualization of the second image dataset based on the adapted preset map.

21. The non-transitory computer-readable medium according to claim 19, further comprising a display code segment for displaying the rendered 3D visualization to a user.

22. The non-transitory computer-readable medium according to claim 19 comprising code segments executable by a processor for performing a method for creating a preset map for visualization of an image dataset, said method comprising dynamically adapting said preset map based on image dataset properties resulting in an adapted preset map.

\* \* \* \* \*